June 3, 1924.
E. KALLMEYER
KITCHEN STOVE
Filed Nov. 28, 1923
1,496,546
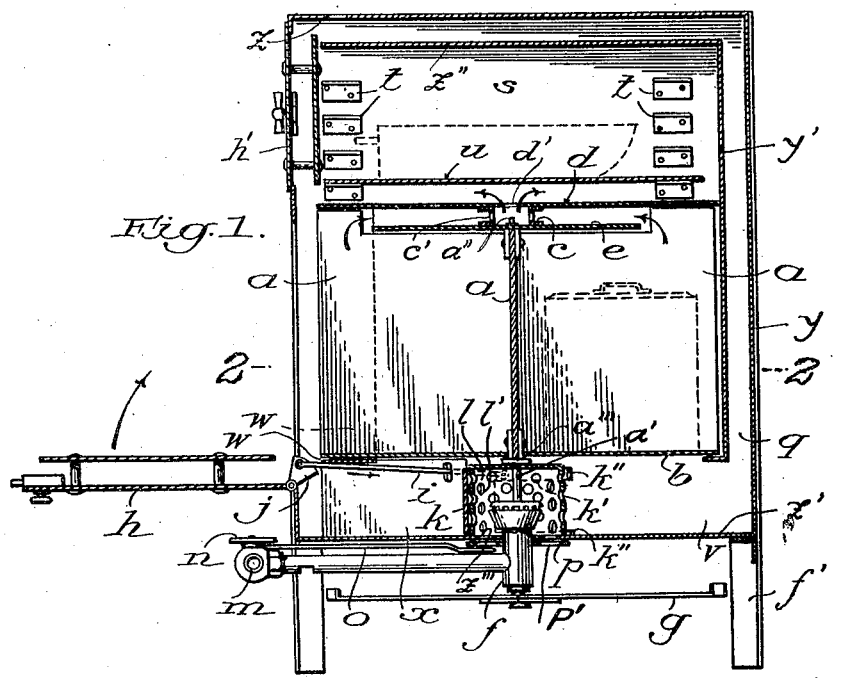
Fig. 1.
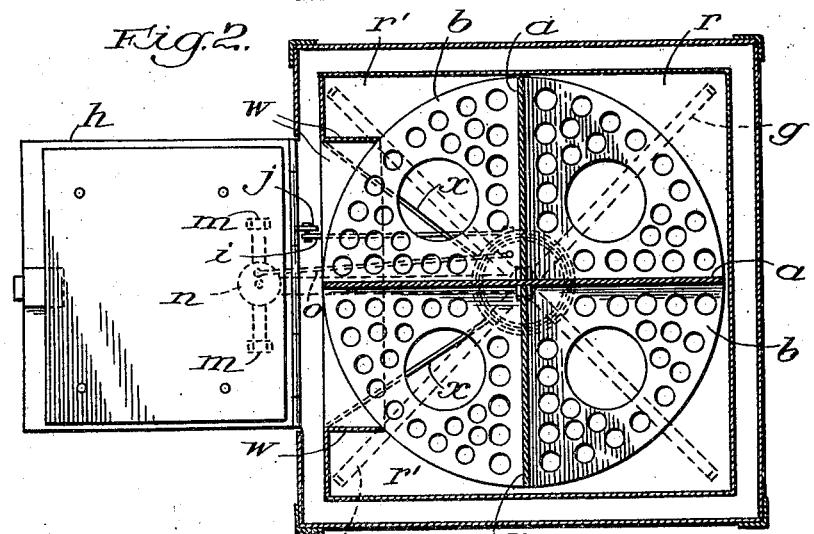
Fig. 2.
Fig. 3.
Inventor
E. Kallmeyer
by C. P. Goepel
attorney Patented June 3, 1924.

1,496,546

UNITED STATES PATENT OFFICE.

ERNST KALLMEYER, OF BURGBERNHEIM, NEAR ANSBACH, GERMANY.

KITCHEN STOVE.

Application filed November 28, 1923. Serial No. 677,394.

*To all whom it may concern:*

Be it known that I, ERNST KALLMEYER, a citizen of Germany, residing in Burgbernheim, near Ansbach, Mittelfranken, Germany, have invented certain new and useful Improvements in Kitchen Stoves, of which the following is a specification, reference being had therein to the accompanying drawings.

One object of my invention is to provide a stove for cooking and baking purposes, the heat of which is substantially retained in it, when the door is opened.

With this object in view I employ a support carrying a series of partitions, preferably four partitions, forming a cross, said support being rotatably mounted in the stove so that access to a single sector of the cross may be had, when the door is opened.

It is a further object of my invention to provide a simple and efficient means for connecting the door with a shield movable about the burner so that the heat is retained when the door is opened.

With these and other objects in view the invention consists in certain novel features of construction and arrangements of parts hereinafter described and claimed, the advantages of which will be obvious to those skilled in the art from the following description.

In the accompanying drawings illustrating the preferred form of the invention, Figure 1 represents a central longitudinal section through the stove.

Figure 2 is a transverse section on the line 2—2 of Figure 1, and

Figure 3 is a detail of the gas and air control on an enlarged scale.

The kitchen stove is formed by a sheet-casing $y$ of rectangular section. This casing is closed at its upper end by a cover $z$ and at the lower end by a bottom $z'$. Legs $f'$ are provided to support the casing and openings are provided in the front wall of the casing in order to give access to the interior of the casing. The said openings may be closed by doors $h$ and $h'$. In the casing $y$ a second casing $y'$, also of rectangular section, is located, and is spaced as at $q$ from the casing $y$.

The casing $y'$ is closed at its upper end by a cover $z''$. The casing $y'$ has a baffle plate $d$ and is open at its lower end. At the bottom portion of the casing $y'$ a circular perforated plate $b$ is provided. This plate $b$ is fixed to a rotatably mounted trunnion $a'$ and supports four partitions $a$ in cross-fashion making four compartments. Centrally above the partitions is a stud $a''$, which is rotatably mounted in a circular plate $e$, fixed by means of two U-shaped irons $c$ to the baffle plate $d$. The U-shaped irons $c$ are provided with openings $c'$ and the plate $d$ has a central slot $d''$ between the said U-shaped irons. The partitions $a$ are cut away at the upper end in the form as illustrated in Figure 1.

The trunnion $a'$ projects down through a cylinder $l$ and is supported on the cylinder by means of a disc $a'''$ bearing against the cover of the said cylinder. The trunnion $a'$ also passes down through the burner $f$ and projects therebeneath. To the lower end of the trunnion $a'$ is affixed a cross-handle $g$, so that by rotating the handle the partitions $a$ are turned, the arrangement being such that when an arm of the cross-handle $g$ projects beneath the central part of the door $h$, one of the compartments enclosed by two adjacent partitions $a$ is behind the door $h$.

The bottom $z'$ is provided inside of the cylinder $l$ with openings $z'''$, arranged opposite to the openings $p'$ provided in a disc $p$, rotatably mounted about the burner $f$ and beneath the bottom of the cylinder.

The gas enters at $m$ or $m'$, as the case may be, and its entrance into the burner may be regulated by a disc $n$. This disc $n$ is pivotally connected by a rod $o$ (Figure 3) to the disc $p$, the arrangement being such, that in the event of greater gas supply also a greater air supply is secured and vice versa.

The cylinder $l$, which surrounds the burner $f$, is partially masked by a shield having two guiding rings $k''$ sliding about on the cylinder. The cylinder $l$ is provided with openings $l'$.

Rigidly connected to the door $h$ is a sector $j$ which is pivotally connected by means of a rod $i$ with the shield $k$, the arrangement being such, that, when the door $h$ is in its open position, the openings $l'$ adjacent to the door $h$ are masked by the shield $k$.

Walls $u$ extend from the casing $y'$ to the circular edge of the compartments. The object of these walls is to prevent the hot air from escaping. For the same purpose two radially extending sheets $x$ are provided in the space $v$ containing the cylinder $l$.

The space above the plate $d$ forms the baking chamber. It is provided with supports $t$ in different levels, so that a sheet $u$ may be adjusted to various elevations.

The operation is as follows:—

If it is desired to have access to anyone of the compartments enclosed by two adjacent partitions $a$ the cross-handle $g$ is turned by hand and the door $h$ opened. The hot air contained in the stove is substantially retained by the sheets $w$, $x$ and the shield $k$.

The hot gases pass normally through the openings of the supporting plate $b$, through the space $q$ and the corner portions $r'$. That part of the hot gases, passing through the space $q$ heats the inner casing $y'$ and that part of the hot gases passing through the perforated plate $b$ and corners $r$ and $r'$ impinges against the baffle plate $d$, penetrates the openings $c'$ and the slot $d'$ and enters the baking chamber.

Instead of the gas burner, described, my invention is also applicable to the use of other heating means, as coal, wood, kerosene, etc.

This invention may be developed within the scope of the following claims without departing from the essential features of the same and it is desired that the specification and drawings be read as being merely illustrative and not in a limiting sense except as necessitated by the prior art.

I claim:—

1. A kitchen stove comprising a casing having an opening, a door for closing the opening, a rotary perforated support in said casing, crossed-partitions on said support dividing the space above the support into a number of compartments, means on the exterior of the casing for rotating the support and partitions to bring the compartments successively opposite the door, a burner beneath the perforated support, a perforated cylinder about the burner, an arcuate shield partially enveloping said cylinder and adjustable thereabout and adjusting means coupled to said shield and to the door.

2. A kitchen stove comprising a casing having an opening, a door for closing the opening, a rotary perforated support in said casing, crossed-partitions on said support dividing the space above the support into a number of compartments, means on the exterior of the casing for rotating the support and partitions to bring the compartments successively opposite the door, a burner beneath the perforated support, a perforated cylinder about the burner, an arcuate shield partially enveloping said cylinder and adjustable thereabout, an arm movable with said door, and a link coupled to said arm and to the shield for drawing the shield toward the door when the latter is opened.

3. A kitchen stove comprising a casing, a perforated rotary support therein, crossed-partitions above and rotating with said support, a burner beneath the support, means below the casing and burner and connected to said rotary support for manually rotating said support and partitions, an oven above said partitions, and a baffle plate between said partitions and oven having a restricted opening for the escape of hot gases into the oven.

In testimony that I claim the forgoing as my invention, I have signed my name.

ERNST KALLMEYER.